(12) United States Patent
Yamashita

(10) Patent No.: US 6,522,359 B1
(45) Date of Patent: Feb. 18, 2003

(54) IMAGE SIGNAL PROCESSING APPARATUS FOR IMAGE SENSOR

(75) Inventor: Hiromi Yamashita, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 1202 days.

(21) Appl. No.: 08/590,348

(22) Filed: Jan. 23, 1996

(30) Foreign Application Priority Data

Feb. 22, 1995 (JP) .............................................. 7-033701

(51) Int. Cl.⁷ .......................... H04N 5/335; H04N 3/14
(52) U.S. Cl. ..................................................... 348/312
(58) Field of Search ................................ 348/222, 312, 348/572, 581, 240, 262, 264, 222.1, 240.2; 358/474, 486, 473, 471, 494, 409, 410, 412

(56) References Cited

U.S. PATENT DOCUMENTS

| | | | |
|---|---|---|---|
| 4,891,713 A | * 1/1990 | Mizukoshi et al. | ......... 358/445 |
| 5,132,788 A | * 7/1992 | Hirota | ........................ 358/517 |
| 5,144,445 A | * 9/1992 | Higashitsutsumi | .......... 348/312 |
| 5,153,421 A | 10/1992 | Tandon et al. | |
| 5,268,757 A | 12/1993 | Nagai et al. | |
| 5,268,765 A | 12/1993 | Yamashita | |
| 5,381,175 A | 1/1995 | Sudo et al. | |

FOREIGN PATENT DOCUMENTS

| | | |
|---|---|---|
| DE | 3542884 | 6/1986 |
| JP | 6195667 | 5/1986 |
| JP | 5292407 | 11/1993 |

* cited by examiner

Primary Examiner—Aung S. Moe
(74) Attorney, Agent, or Firm—Rothwell, Figg, Ernst & Manbeck

(57) ABSTRACT

An image signal processing apparatus of the present invention comprises an image sensor for outputting an image data, a sample hold circuit for holding an image data output, a sample hold circuit outputs an analog signal, AD converter for converting the analog signal to a digital signal, a system clock generator for generating a first clock $\phi 1$, a timing generator for controlling hold timing of sample hold circuit according to the first clock $\phi 1$, a second system clock generator for generating a second system clock $\phi 2$ having different phase from the phase of the first system clock $\phi 1$ and AD conversion clock generator for controlling conversion timing of AD converter according to the second clock $\phi 2$. Since two different clocks are used, hold timing does not overlap with a conversion timing. Therefore, the reading of the image data becomes stable and misreading can be reduced and also quality of an image is improved.

3 Claims, 15 Drawing Sheets

102a : SIG WAVEFORM WHEN READING WHITE MANUSCRIPT
102b : SIG WAVEFORM WHEN READING BLACK MANUSCRIPT

IMAGE SIGNAL PROCESSING APPARATUS FOR IMAGE SENSOR

BACKGROUND OF THE INVENTION

1. Field of the Invention

The present invention relates to an image signal processing apparatus for image sensor used for reading image data.

2. Description of the Prior Art

For an image input device such as a facsimile equipment, contact type image sensors using photo transistor sensor elements are used, for example, as disclosed in Mitsubishi Electric Corporation integrated electron device catalogue H-C0274-C, 9109 (ROD). The object of the image enlargement and reduction processes for image signal read from the image sensor is not only to magnify or reduce a manuscript but also to compensate the inconsistency of size or resolution between an input device and an output device, which is extremely important processing technique. For the image enlargement and reduction enlargement and reduction processes for image signal, a method of thinning, superposition or interpolation and so on, which is carried out after the image signal is changed to binary codes, is commonly used.

This kinds of techniques are disclosed in a laid-open Japanese patent publication No.4-315360 and a laid-open Japanese patent publication No.4-332255. It is possible to carry out enlargement and reduction processes flexibly by means of a relatively simple logic circuit. According to these processing methods, enlargement or reduction ratio can be changed programmably, which has therefore few errors. It is further possible to use relatively low frequency for a basic system clock.

FIG. 13 shows a block diagram of a conventional image signal processing apparatus for image sensor. FIG. 14 shows a timing chart between an image input and output of an image signal processing apparatus for image sensor.

In FIG. 13, image sensor 1 sequentially outputs an image data SIG which the image sensor has read according to a start pulse SI and a clock pulse CLK1 inputted from a timing generator 4. A sample hold circuit 2 holds an image data SIG for a predetermined period according to a sample hold pulse S/H inputted from a timing generator 4. AD converter 3 receives image data SIG0 from the sample hold circuit 2, and converts the image data SIG0 from an analog signal to a digital signal according to AD conversion clock (ADC CLOCK) inputted from AD conversion clock generator 5. A timing generator 4 generates a timing signals (SI, CLK1 and S/H) according to a system clock $\phi$ inputted from a system clock generator 6, a start pulse SII and a control signal (PARAMETER DATA) for setting an operation mode of the image signal processing apparatus. AD conversion clock generator 5 generates ADC CLOCK according to a system clock $\phi$, a start pulse SII and a control signal (PARAMETER DATA). A system clock generator 6 generates a system clock $\phi$. A start pulse SII and control signal PARAMETER DATA are inputted from CPU or a system when necessary which is not illustrated in FIG. 13.

An operation of the prior art is explained below. FIG. 14 shows an example of timing in case of carrying out reduction processing. That is, a frequency division ratio of a system clock $\phi$ of an image processing side takes a value of m1=8 and a frequency division ratio of a system clock $\phi$ of an image input side take a value of m2=6 (see CTR 1). FIG. 14 also shows a timing in case that a system clock includes a frequency division value of 5 for every three times in the frequency division value of 6 (see CTR 2).

An image processing side timing is generated by dividing the system clock supplied from the system clock generator 6 by 8. An image processing side not illustrated in FIG. 14 takes images in synchronism with the image processing side timing (see arrow A in FIG. 14).

In an image input side timing chart shown in bottom part of FIG. 14, CTR 0~2 illustrate respective output bits of a counter incorporated in the timing generator 4. The counter is not illustrated in FIG. 14. The counter counts the system clock and a frequency division value changes 5, 6, 6 in turn. A clock pulse CLK1 and a sample hold pulse S/H are generated from these signals.

An image data SIG from the image sensor is outputted in synchronism with the clock pulse CLK1. In FIG. 14, image data SIG are read according to the order of a, b, c, . . . , j. The sample hold pulse S/H is a signal for clamping the image data SIG. The image data SIG becomes logical high "H" for a predetermined period where the image data SIG takes the peak value just before clock pulse CLK1 starts to rise. A value of the image data SIG0 is changed by the peak value of the image data SIG when sample hold pulse S/H is generated. An image data SIG0 becomes a, b, c, . . . , j corresponding to the value of image data SIG. The image data SIG0 is taken into the image processing side at the timing as shown by arrows in FIG. 14.

By the way, since a frequency division value of the timing of the image processing side system clock is different from that of the image input side system clock, the image data SIG does not correspond to the data at the image processing side by one to one. Each data which are read into the image processing side is in the order of a, c, d, f, g, h (or i), j in turn. In other words, 7 image data are read out of 10 image data a, b, . . . , j. In general, assuming that the number of picture elements and clock frequency of the picture element at the image processing side are N1, f1, respectively, and the number of picture elements and clock frequency of the picture element is N2, f2, respectively, the following relation ship can be obtained.

$$N1 \times f2 = N2 \times f1$$

By using the circuit which makes the above operation possible, it is possible not only to simply enlarge or reduce an image but also to convert freely the picture element density of a sensor. In other words, it is possible to realize extremely flexible high density using only one kind of picture element density, such as taking out image signals of 300 dpi easily by using, for example, a sensor having 16 dots/mm.

Considering a point shown by arrow A on SIG0 timing in FIG. 14, a timing for taking the image data into the image processing side overlaps to a timing where the image data SIG0 changes its value. At the point A, since image data SIG0 changes its step shape, data taken in are unstable and then it is impossible to take in a correct image information at the image processing side. Accordingly, periodical vertical lines appear in outputted image. Since both of the image processing side timing and the image input side timing are generated by the same system clock $\phi$, it is not possible to prevent the occurrence of above periodical vertical lines.

When an enlargement processing is carried out, there occur following problems. When the enlargement processing is carried out, frequency of clock pulse CLK1 is set lower than that of 100% enlargement ratio. FIG. 15 shows a relation among clock pulse CLK1, sample hold pulse S/H, image data SIG and SIG0 for each 100% (same ratio) and 200% (twice) enlargement ratio, respectively.

As shown in FIG. 15, period of logical low "L" of clock pulse CLK1 for 200% enlargement ratio is longer than "L" period of clock pulse CLK1 of 100% enlargement ratio. Image data SIG is outputted as an integral waveform from image sensor 1 during "L" period of clock pulse CLK1. Although the peak value V of the output waveform of the image data SIG increases when "L" period of clock pulse CLK1 is getting longer, but the peak value V saturates gradually.

In FIG. 15, period of sample hold point of 200% enlargement processing of image data is longer than that of 200% enlargement processing. Therefore, a relation between the level (V100%) of SIG0 at 100% enlargement processing and the level (V200%) of SIG0 at 200% enlargement processing is expressed as V100%<V200%, which means that levels of image data are different according to the respective enlargement ratios. Since the image data SIG is an integral waveform, sampled values V100 and V200 have no linear relation and then it is difficult to compensate the levels. As described above, in the conventional image sensor for enlarging or reducing images, there is a problem that image quality deteriorates.

It is an object of the present invention to provides an image signal processing apparatus for image sensor which does not deteriorate quality of image during enlargement or reduction processing.

SUMMARY OF THE INVENTION

According to one aspect of the invention, an image signal processing apparatus for image sensor comprises an image sensor for reading image data and for outputting the image data as image data; a sample hold circuit for holding the image data output; AD converter for converting an analog signal outputted AD converter for converting an analog signal outputted from the sample hold circuit to a digital signal; a first reference signal generator for generating a first reference signal; a timing generator for controlling hold-timing of the sample hold circuit according to the first reference signal; a second reference signal generator for generating a second reference signal whose phase is different from that of the first reference signal; and AD conversion timing generator for controlling conversion timing of AD converter according to the second reference signal.

According to another aspect of the invention, an image signal processing apparatus for image sensor comprises: an image sensor for reading image data and for outputting the image data as image data; a sample hold circuit for holding the image data output; AD converter for converting an analog signal outputted from the sample hold circuit to a digital signal; a reference signal generator for generating a reference signal; a timing generator for controlling hold-timing of the sample hold circuit according to the reference signal; AD conversion timing generator for controlling conversion timing of AD converter according to the reference signal; and a timing discriminator for shifting either the hold-timing or the conversion-timing when hold-timing of the sample hold circuit and the conversion-timing of AD converter is matched.

According to further aspect of the invention, an image signal processing apparatus for image sensor comprises: an image sensor for reading image data and for outputting the image data as image data; a sample hold circuit for holding the image data output; a filter circuit for reducing variation of a signal outputted from the sample hold circuit; AD converter for converting an analog signal outputted form the filter circuit to a digital signal; a reference signal generator for generating a reference signal; a timing generator for controlling hold-timing of the sample hold circuit according to the reference signal; AD conversion timing generator for controlling conversion timing of AD converter according to the reference signal.

According to further aspect of the invention, an image signal processing apparatus for image sensor comprises: an image sensor for reading image data and for outputting the image data as image data; a sample hold circuit for holding the image data output; AD converter for converting an analog signal outputted from the filter circuit to a digital signal; a reference signal generator for generating a reference signal; a timing generator for generating a timing signal which reads out image data from the image sensor and a hold-timing signal which controls hold timing of the sample hold circuit according to the reference signal; AD conversion timing generator for controlling conversion timing of AD converter according to the reference signal; wherein, the timing generator changes either the reading timing signal or the hold timing so that the same data from the starting point of the output of the image data is held, when changing the output period of the image data.

According to further aspect of the invention, in an image signal processing apparatus for image sensor, the timing generator further comprises: means for generating constant reading period for causing the reading period to be constant by changing the reading timing signal when changing the output period of the image data.

According to further aspect of the invention, in an image signal processing apparatus for image sensor, the timing generator further comprises: means for generating constant sample timing which changes the hold timing signal corresponding to the change of reading period of the image data when changing the output period of the image data.

DETAILED DESCRIPTION OF THE PREFERRED EMBODIMENTS

Embodiment 1

Figure 1:
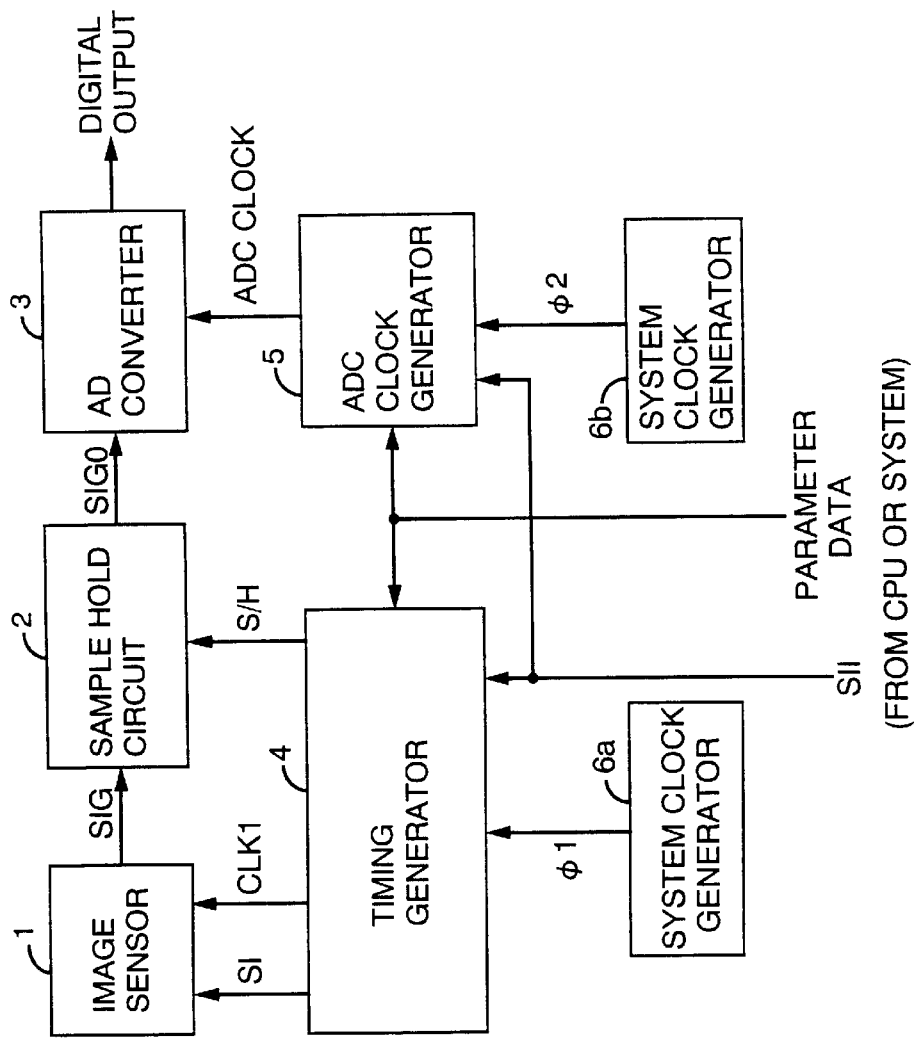
FIG. 1 is a block diagram showing an image signal processing apparatus for image sensor of a first embodiment of the present invention.

An embodiment of the present invention is explained below in detail using FIG. 1, FIG. 2 and FIG. 3. FIG. 1 is a block diagram showing an image signal processing apparatus for image sensor according of the first embodiment. In FIG. 1, an image sensor 1 outputs sequentially image data SIG according to start pulse SI and clock pulse CLK1 outputted from timing generator 4. Where, the image data SIG is serial signals. Sample hold circuit 2 holds the image data SIG for a predetermined period, according to a sample hold pulse S/H inputted from an outer apparatus. AD converter 3 receives image data SIG0 outputted from sample hold circuit 2 and converts the analog signal into a digital signal according to ADC CLOCK inputted from AD conversion clock generator 5. A timing generator 4 generates a timing signal SI, CLK1 and S/H according to a system clock $\phi1$, a start pulse SII which is inputted from outer apparatus, and a control signal (PARAMETER DATA) which is used for setting operation mode of the image signal processing apparatus. AD conversion clock generator 5 generates ADC CLOCK according to a system clock $\phi2$, a start pulse SII and PARAMETER DATA.

System clock generators 6a and 6b generate a system clock $\phi1$ and system clock $\phi2$, respectively. As shown in FIG. 3, system clock $\phi1$ and $\phi2$ have the same time period but they differ 180 degrees in phase to each other. A start pulse SII and a control signal (PARAMETER DATA) are inputted when necessary, from CPU or system not illustrated.

Figure 2:
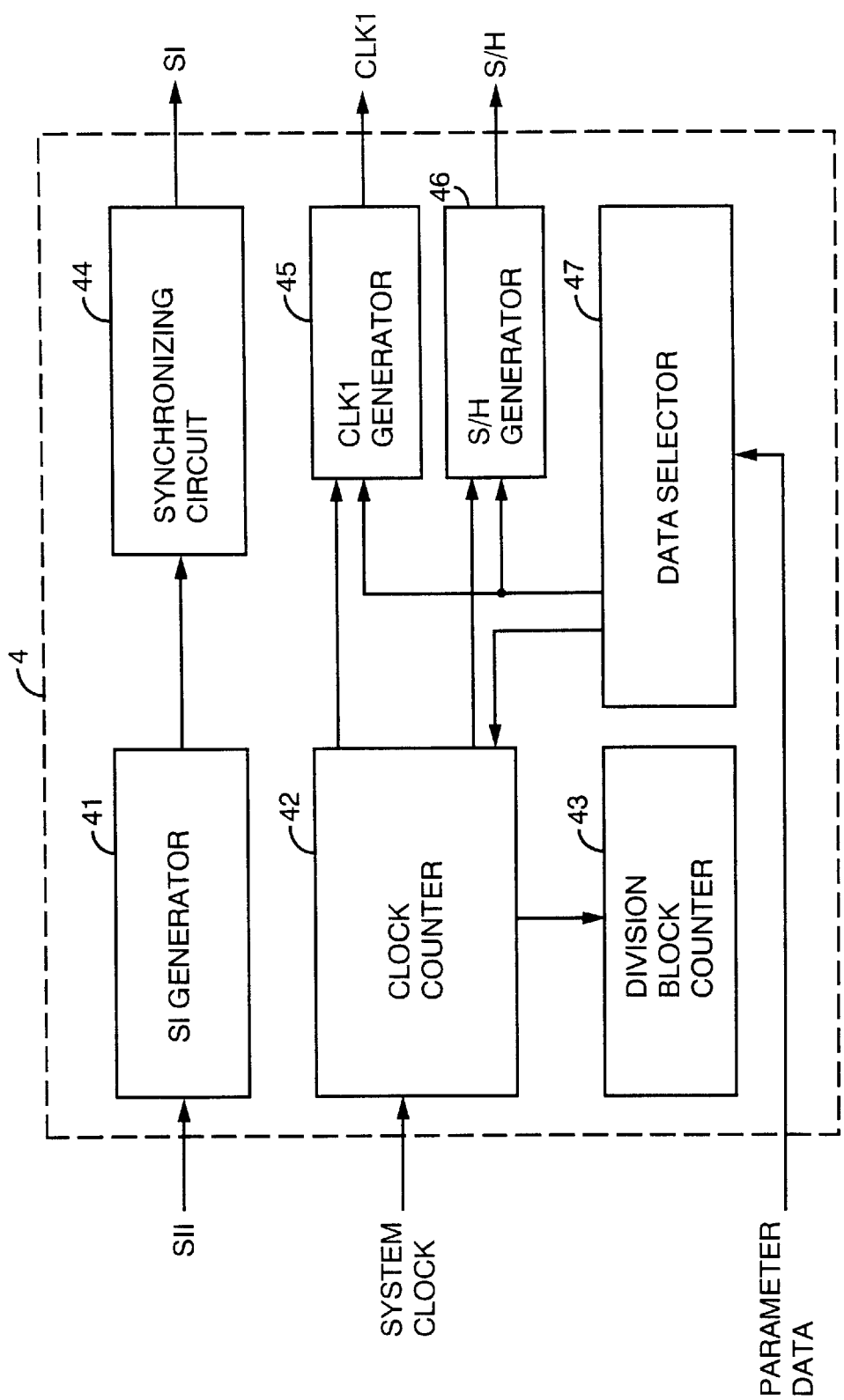
FIG. 2 is a block diagram showing a timing generator of the first embodiment of the present invention.

FIG. 2 is a block diagram showing internal construction of timing generator 4. In FIG. 2, SI generator 41 receives a start pulse SII and generates SI signal and then outputs it to synchronous circuit 44 in synchronization with clock pulse CLK1. Clock counter 42 counts the number of system clock $\phi1$. Division block counter 43 divides a system clock $\phi1$ according to an output of clock counter 42. CLK1 generator 45 and S/H generator 46 generate clock pulse CLK1 and a sample hold pulse S/H, respectively, according to an outputs from clock counter 42 and data selector 47. Data selector 47 selects an output of division block counter 43 according to PARAMETER DATA inputted from an outer system or CPU, and outputs the selected signals to clock counter 42, CLK1 generator 45 and S/H generator 46, respectively. That is, the timing generator 4 is able to change the period and the phase of the output signals according to PARAMETER DATA from outside apparatus.

An operation of the first embodiment is explained below using a timing chart shown in FIG. 3. In FIG. 3, the timing generator 4 generates clock pulse CLK1 and sample hold pulse S/H signal by dividing the system clock $\phi1$ which is provided from the system clock generator 6a by division ratio of 5 or 6. On the other hand, the generator 5 generates ADC CLOCK which is provided from the system clock generator 6b by dividing the system clock $\phi2$ by division ratio of 8.

The image data SIG is read out from the image sensor in response to clock pulse CLK1. A waveform of an image data is an integral waveform an then rising shape is relatively steep but its waveform gradually saturates to a constant value as time passes. Sample hold circuit 2 holds an image data SIG according to sample hold pulse S/H and outputs the image data SIG as image data SIG0.

As described above, since a frequency division value of the system clock at the image processing side timing is different from that of the system clock at the image input timing, the image data SIG does not correspond to the data read at the image processing side by one to one. In case of timing shown in FIG. 3, reduction processing is carried out. In general, assuming that the number of picture elements and picture element clock frequency of the image processing side are N1 and f1, relatively, and the number of picture elements and picture element clock frequency of the image input side (image sensor side) are N2 and f2, the next relation is obtained.

$$N1 \times f2 = N2 \times f1$$

Figure 3:
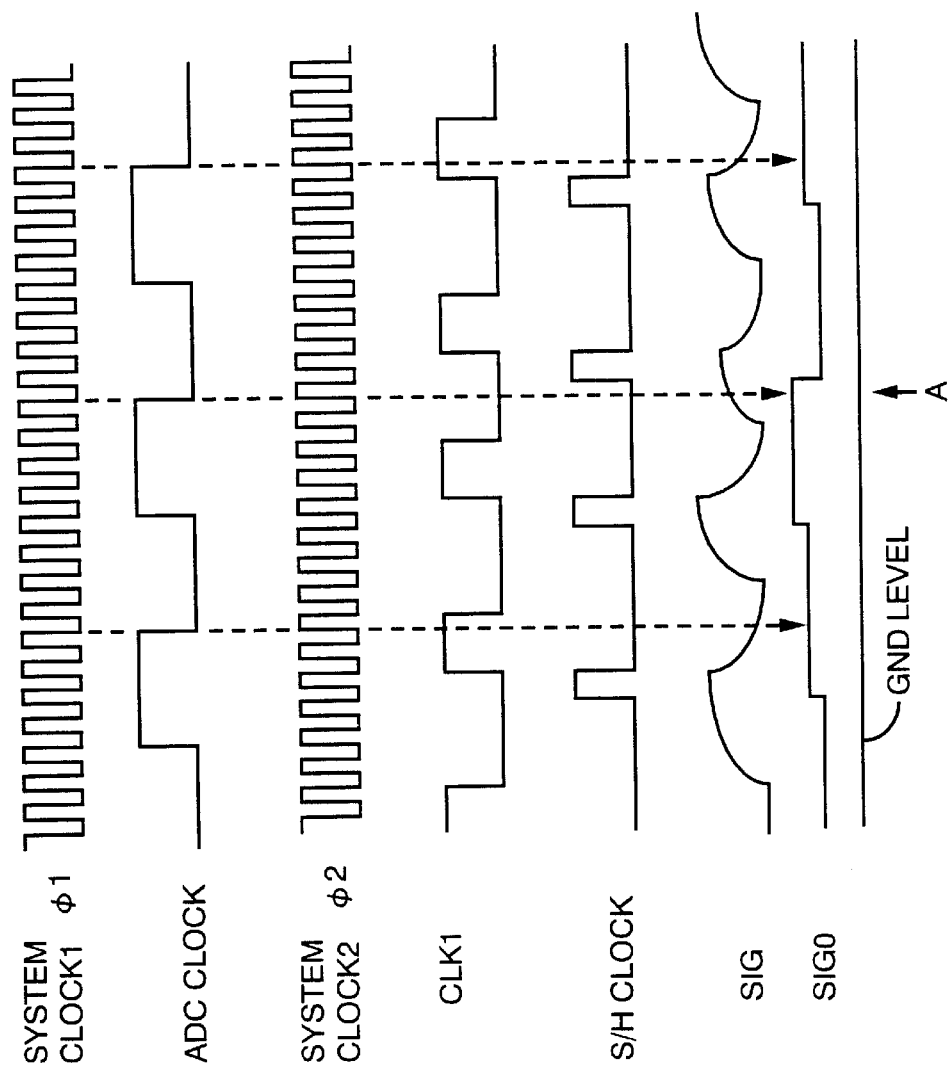
FIG. 3 is a timing chart for taking in image in the image signal processing apparatus for image sensor of the first embodiment of the present invention.

In the image signal processing apparatus of the present embodiment, as shown in A point in FIG. 3, the falling edge of ADC CLOCK does not accord with the falling edge of the sample hold pulse (S/H CLOCK), even when a rising edge of ADC CLOCK approaches closest to the rising edge of the sample hold pulse (S/H CLOCK). Because, each timing signal is generated, respectively, according to two timing signals $\phi1$ and $\phi2$ which have different phases. In this first embodiment, at the timing of falling edge of ADC CLOCK which is conversion timing for converting the signal SIG0 from analog signal to a digital signal, the sample hold circuit 2 holds signal SIG0. Therefore, the signal SIG0 is stable. Accordingly, AD converter 3 is able to take in correct image data and therefore periodical vertical lines do not appear in the output image.

As described above, in the image signal processing apparatus for image sensor of the first embodiment, a control signal of the sample hold circuit and a control signal of AD converter are generated, respectively, according to two kinds of system clocks having the same period but different phases. Therefore, it is possible to prevent the image data SIG0 from changing rapidly. Accordingly, AD converter is able to obtain correct image information and prevent vertical lines effectively which appear in the output image periodically when the image is enlarged or reduced. Thereby, quality of the output image of the image sensor can be improved.

In the above description, although the two kinds of system clocks have the same period, it may have two kinds of system clock of different periods. Although the phase difference of these system clocks is 180 degree, it is possible to use two system clocks having difference phases. The important point is that it is necessary to give a predetermined time lag between the sample hold pulse and AD conversion clock so that AD converter can obtain data correctly.

Embodiment 2

In the first Embodiment, the overlap timing phase can be prevented using two system clock generators. It is further possible to prevent the overlap timing by using phase discriminator which coordinates the two timings.

Figure 4:
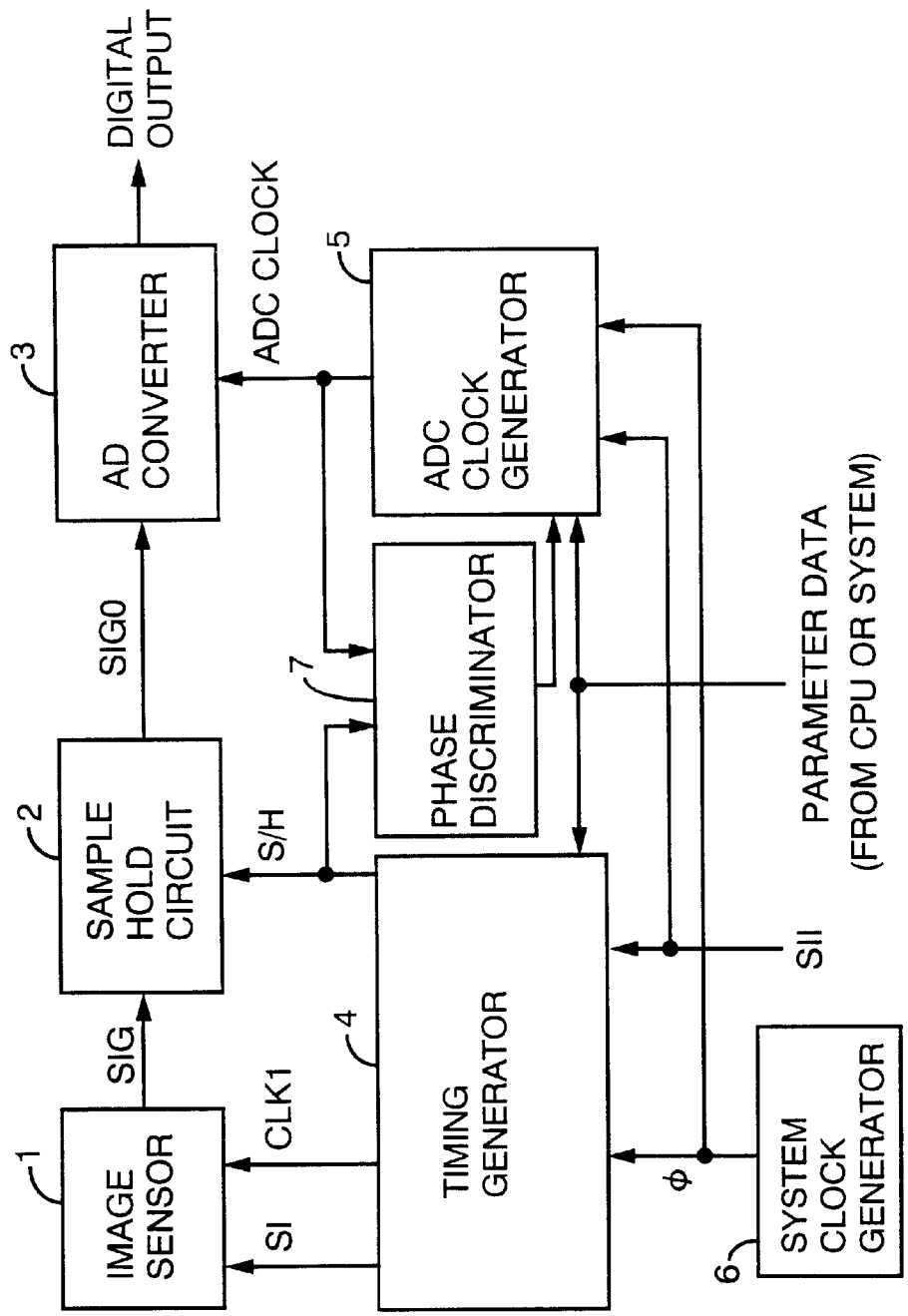
FIG. 4 is a block diagram showing an image signal processing apparatus for image sensor of the second embodiment of the present invention.

FIG. 4 is a block diagram showing an image signal processing apparatus for image sensor of the second embodiment. In FIG. 4, a phase discriminator 7 monitors time period between falling edge of ADC CLOCK (operation point of AD conversion) and rising edge of sample hold pulse S/H (operation point of a sample hold), and then judges that overlap of the timing has occurred when the time period becomes short. The elements having the same reference numbers in FIG. 1 are the same portions or the corresponding portions in FIG. 4. Accordingly the detailed explanation of the same portions are omitted.

Figure 5:
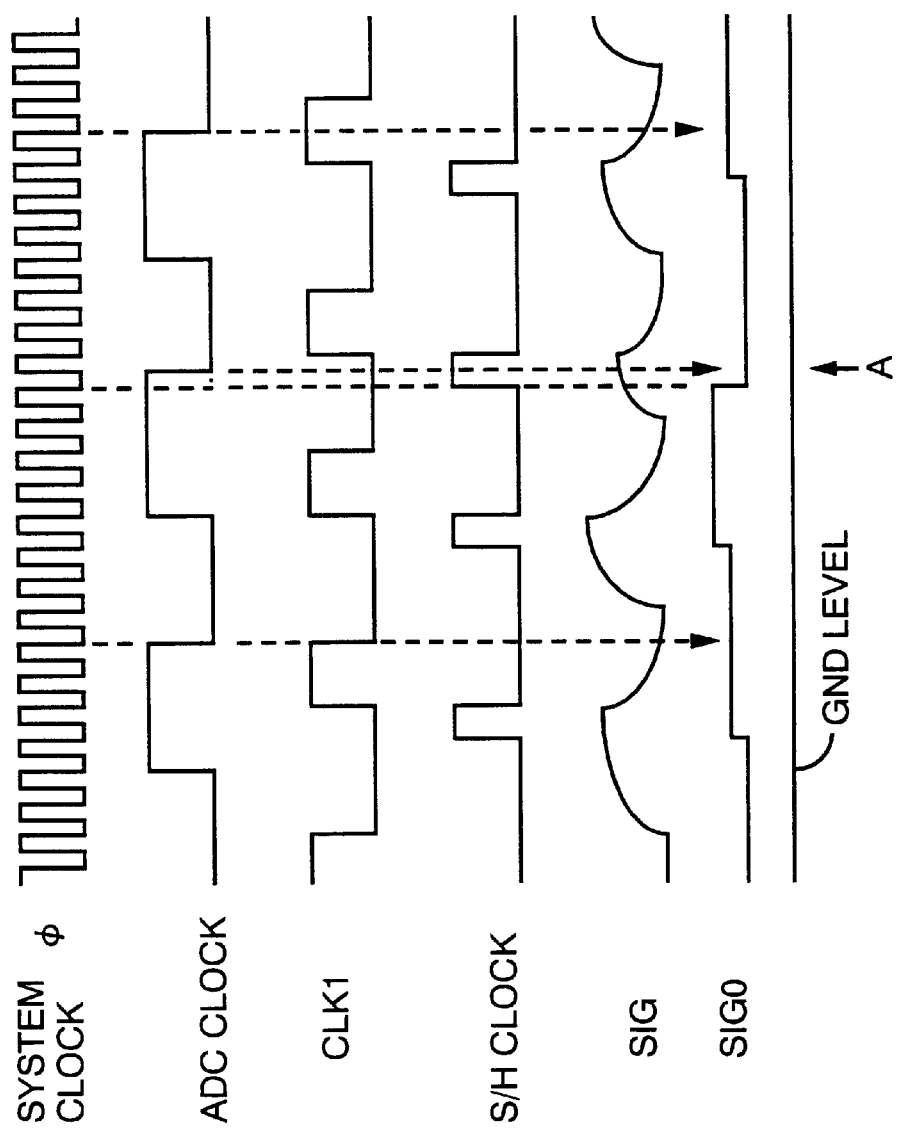
FIG. 5 is a timing chart for taking in the image signal processing apparatus for image sensor of the second embodiment of the present invention.

An operation of the second embodiment is explained below using a timing chart shown in FIG. 5. The phase conversion discriminator 7 monitors ADC CLOCK and sample hold pulse S/H. When the time period between ADC CLOCK and a sample hold pulse S/H is large, the phase discriminator 7 operates as same as the conventional apparatus. But when the time period between them becomes shorter and both phases are seemed to be overlapped, phase discriminator 7 outputs a signal, which shows that the overlap of the phase has occurred, to AD conversion clock generator 5.

AD conversion generator 5 extends falling edge of H level portion of ADC CLOCK according to an inputted signal. Thereby, the falling edge of ADC CLOCK is shifted until the image data SIG0, that is, the output sample hold circuit 2, becomes stable. The quantity for shifting corresponds to, for example, a half periods or one period of the system clock.

As described above, the image signal processing apparatus for the image sensor of the second embodiment has a phase discriminator, which shifts the timing when the phase of timing is different. Therefore, it is possible to prevent the phase of timing even if the same system clock is used, which improves quality of an output image.

Embodiment 3

The above first and the second embodiment are able to prevent vertical lines during the enlargement or reduction processing by avoiding the overlap of the timing. This image signal processing apparatus for image sensor of the third embodiment comprises a low pass filter (LPF) at the output of the sample hold circuit instead of coordinating the timing of the clock pulses.

Figure 6:
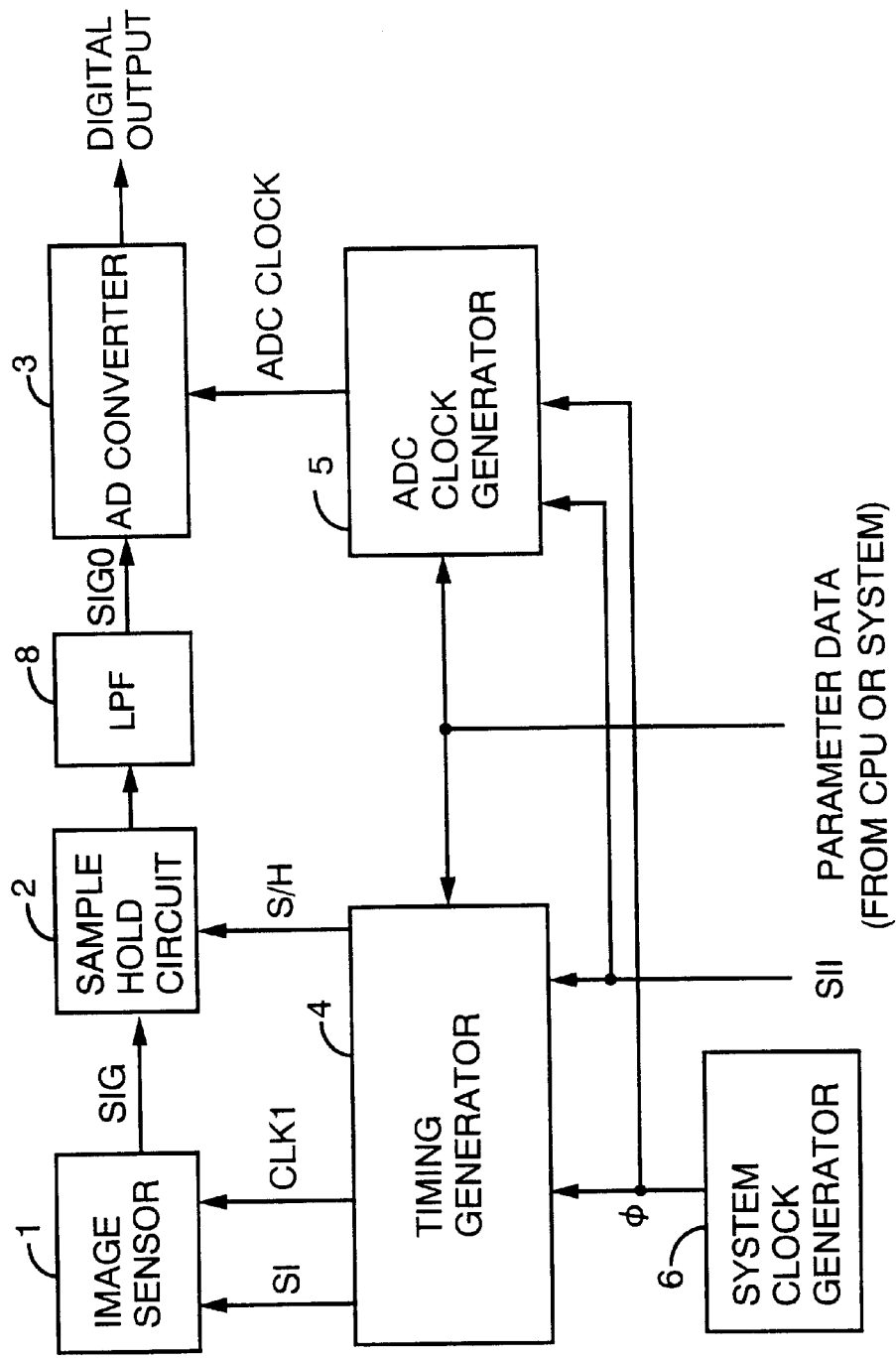
FIG. 6 is a block diagram showing an image signal processing apparatus of a third embodiment of the present invention

FIG. 6 is a block diagram of an image signal processing apparatus for image sensor of the third embodiment. In FIG. 6, the image signal processing apparatus for image sensor comprises LPF 8 which smoothes the output signal from sample hold circuit 2. The elements having the same reference numbers in FIG. 6 are the same portions or the corresponding portions in FIG. 1. Accordingly the detailed explanation of the same portions are omitted.

Figure 13:
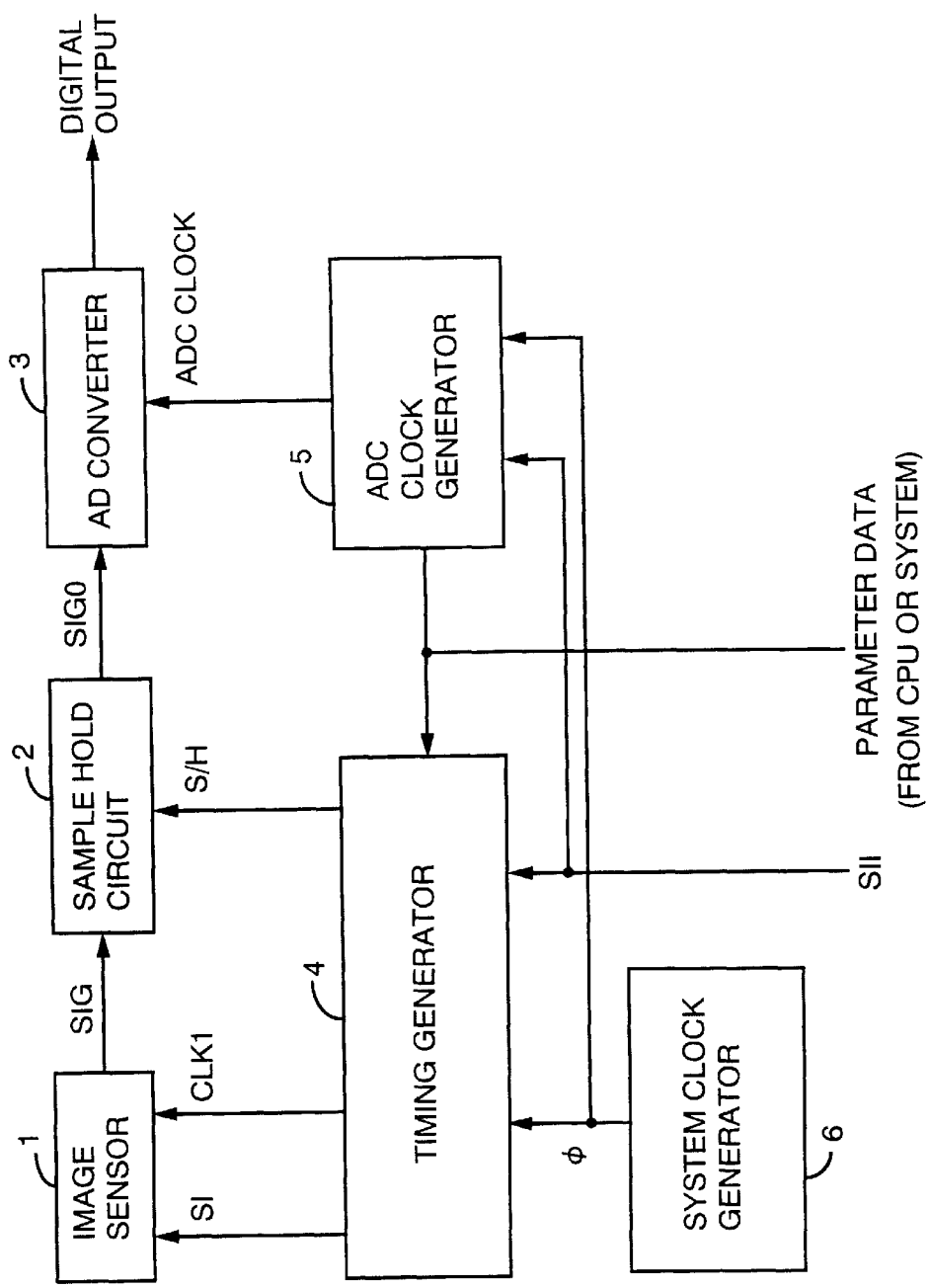
FIG. 13 is a block diagram showing a conventional image signal processing apparatus for image sensor.
Figure 14:
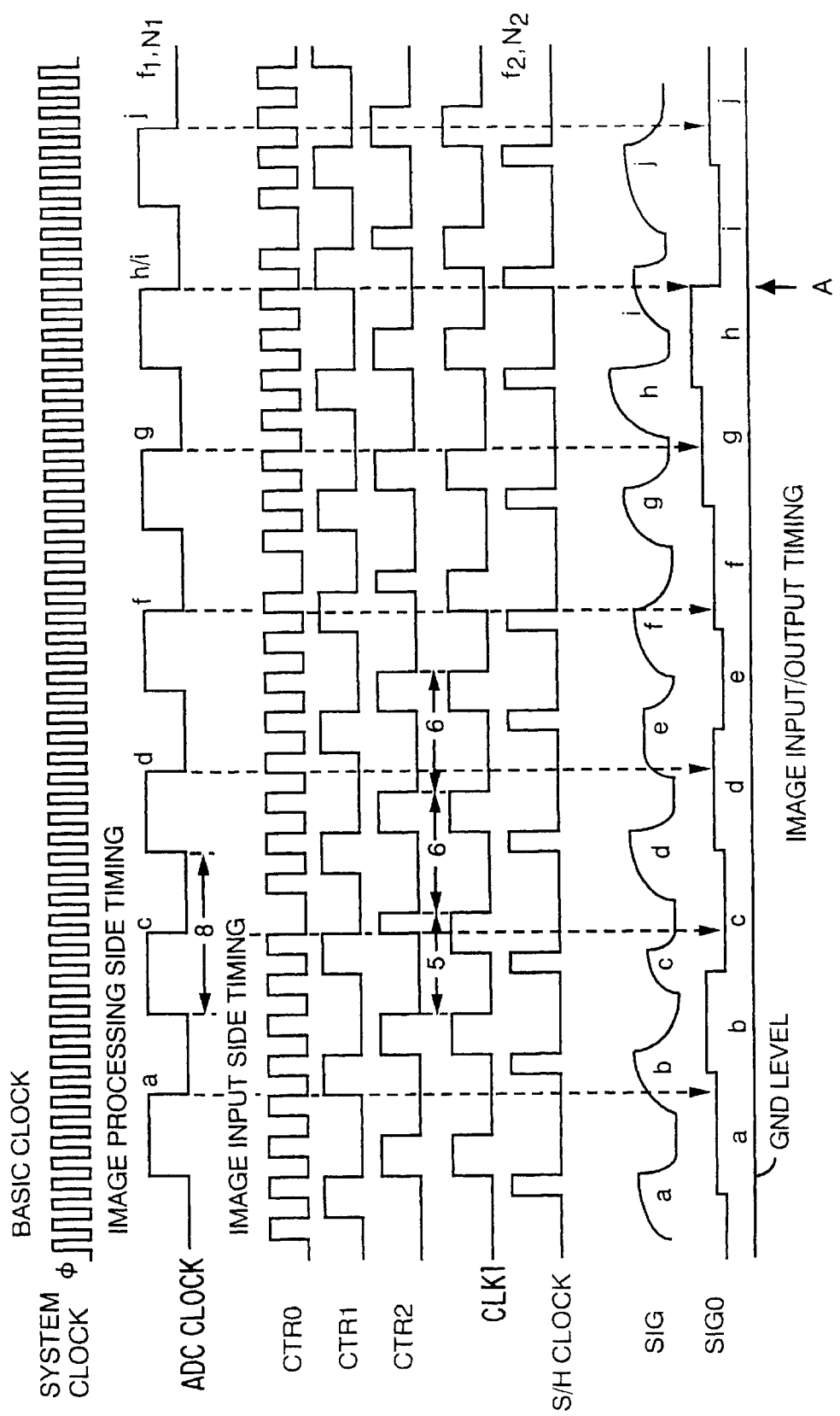
FIG. 14 is a timing chart for taking an image of an image signal processing apparatus of the conventional image sensor.
Figure 15:
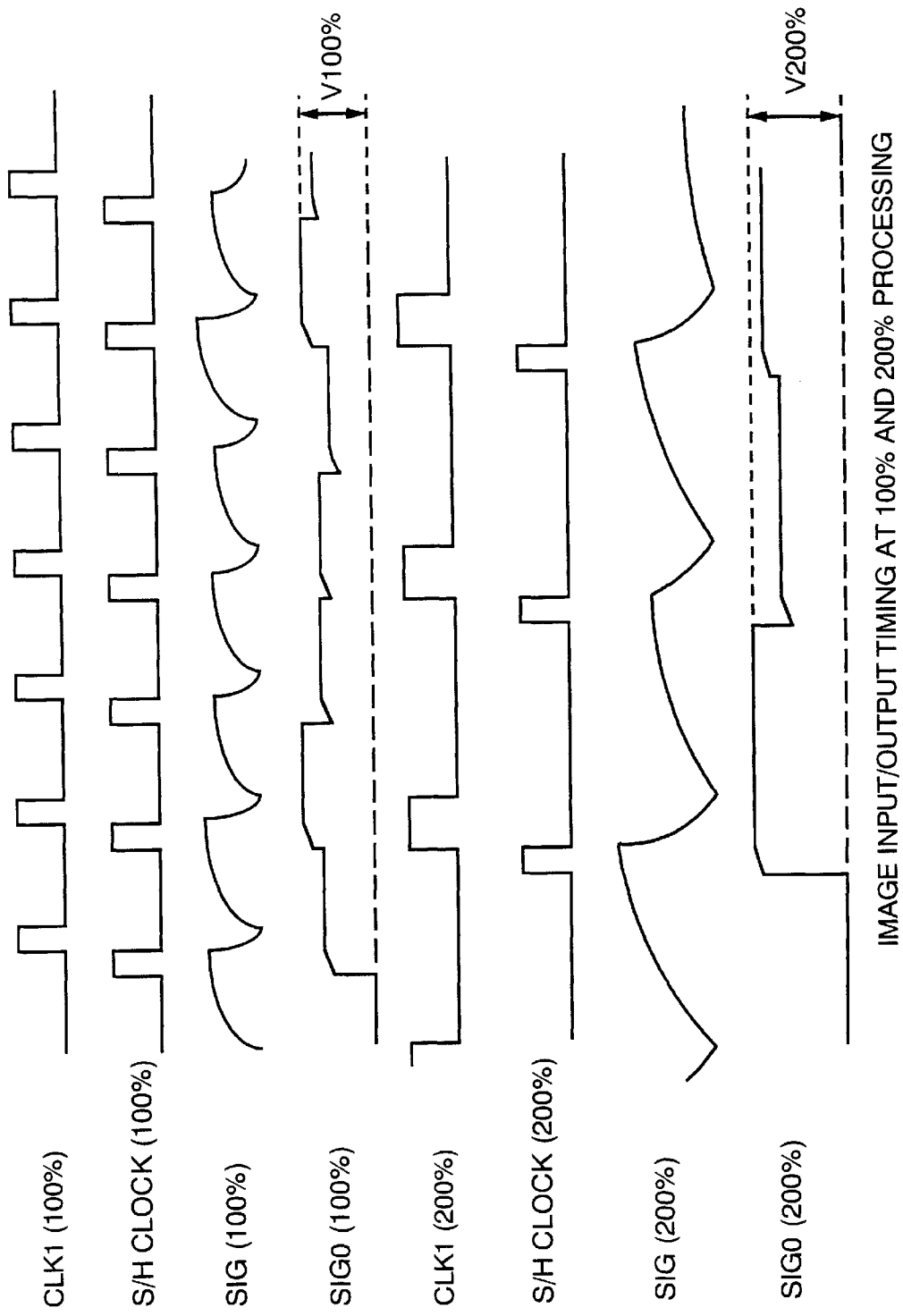
FIG. 15 is a timing chart for taking in an image to explain enlargement operation of the prior art.

An operation of the third embodiment is explained below using FIG. 7. The timing signals in the third embodiment is the same as those of the conventional art in FIG. 13. An image data SIG of the present embodiment is also the same as a conventional image data SIG. But since LPF 8 is incorporated at the output of the sample hold circuit 2, an image data SIG0, which is an output of the sample hold circuit 2, is smoothed as shown FIG. 7. Where, the output of sample hold circuit 2 is step shape as shown by the dotted line.

Figure 7:
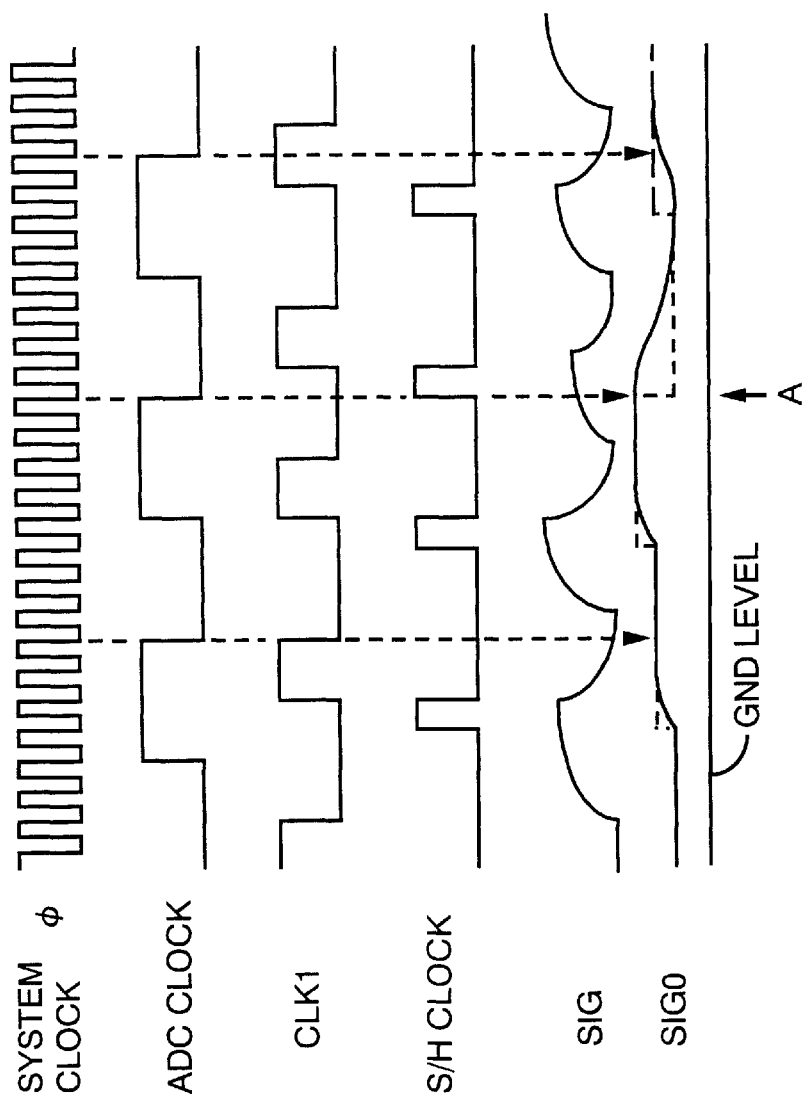
FIG. 7 is a timing chart for taking in an image of the image signal processing apparatus of the third embodiment of the present invention.

When the waveform of image data SIG0 is smoothed, a data provided from AD converter 3 becomes stable and therefore vertical lines do not appear in the output image display, even if falling edge of ADC CLOCK and the rising edge of sample hold pulse S/H are overlapped (see A portion in FIG. 7). That is, since image data SIG0 does not change as step shape as shown by the dotted line, the image data SIG0 does not change sharply even if the timings are overlapped while AD converter is operating. Therefore, it is possible to obtain stable image data.

As described above, since the image signal processing apparatus has an LPF which smoothes the change of the output signal of the sample hold circuit, the image data SIG0 does not change sharply even if the timings are overlapped while AD converter is operating. Therefore, it is possible to obtain good quality of output image display. As a result, it is always possible to take in stable images.

Embodiment 4

An image signal processing apparatus for image sensor of a fourth embodiment comprises a means for making reading period constant in the timing generator 4. The means makes the reading period from reading of the image data to sampling the image data constant, during the enlargement or reduction processing. Thereby the deterioration of image quality caused by saturation of the image data which occurs during enlargement processing can be avoided.

Figure 8:
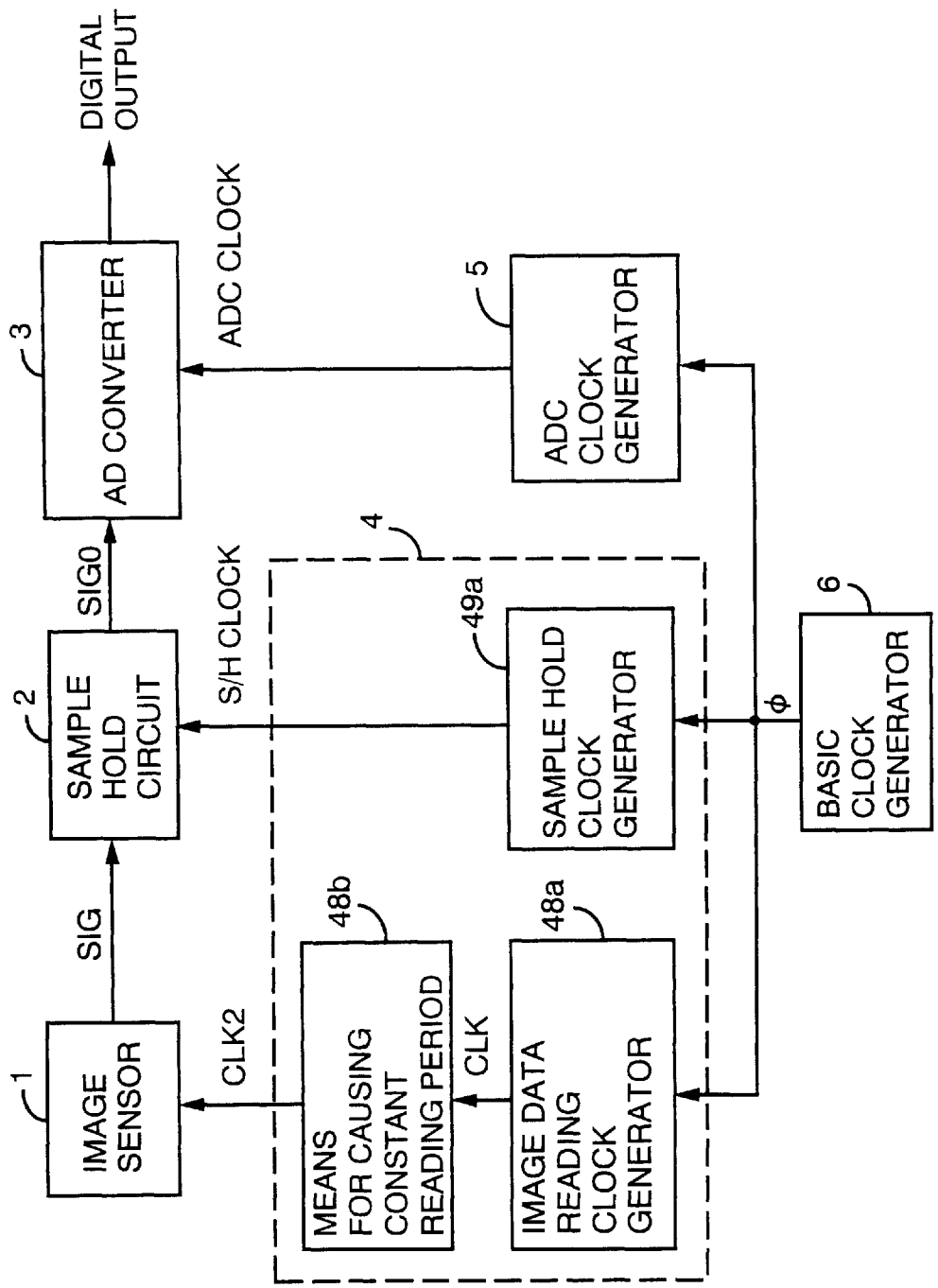
FIG. 8 is a block diagram showing an image signal processing apparatus for image sensor of a fourth embodiment of the present invention.

FIG. 8 is a block diagram showing an image signal processing apparatus of the fourth embodiment. In FIG. 8, a timing generator 4 is the same as that of the timing generator 4 in FIG. 2. This timing generator 4 operates according to the parameter received from outer apparatus.

In FIG. 8, an image signal processing apparatus comprises an image data reading clock generator 48a for generating an image data reading clock CLK (corresponds to CLK1 in FIG. 1) according to a system clock φ, means for generating constant reading period 48b, which for receives clock CLK and for outputting a clock pulse CLK2 to the image sensor 1 where the clock pulse CLK2 is used for making the reading period constant from reading of the image data to sampling of the image data, a sample hold clock generator 49a for generating a sample hold pulse S/H according to the system clock φ and for outputting it to the sample hold circuit 2. Image sensor 1, sample hold circuit 2, AD converter 3, AD conversion clock generator 5 and system clock generator 6 are the same as those shown in FIG. 1 of the first embodiment.

Figure 9:
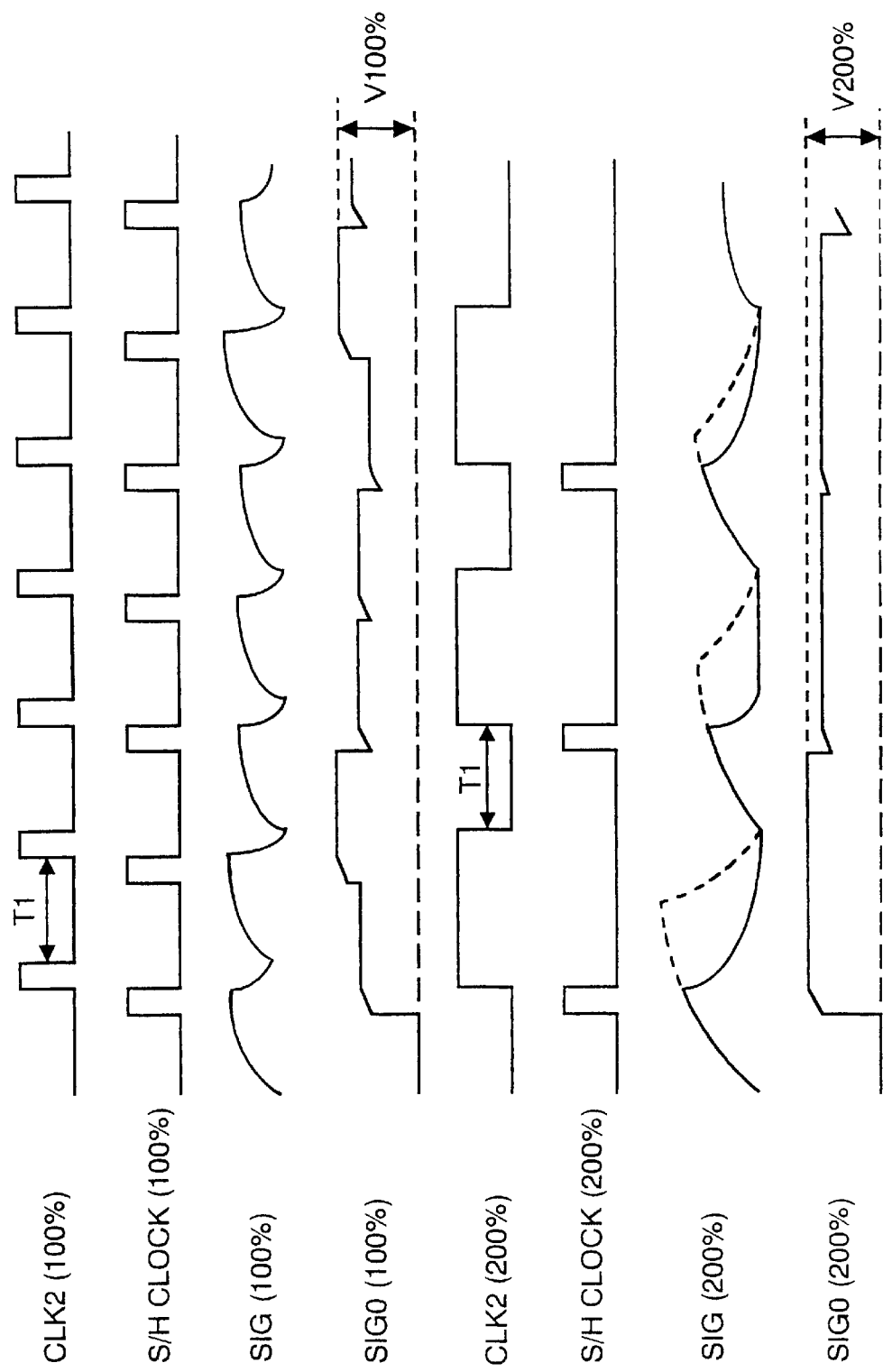
FIG. 9 is a timing chart for taking in an image of the image signal processing apparatus for image sensor of the fourth embodiment of the present invention.

An operation of the fourth embodiment is explained using a timing chart of FIG. 9. The upper four timing charts show a timing for 100% processing where no enlargement or reduction processing is carried out. The lower four timing charts show timings for 200% processing where 200% enlargement processing is carried out.

First, a timing chart for 100% processing is explained. An image data SIG is read out from the image sensor in response to the clock pulse CLK2. When clock pulse CLK2 is logical low "L" level, the image data begins to be read out. When clock pulse CLK2 is logical high "H" level, reading of the image data is stopped. SIG level then decreases to ground (GND) level. When clock pulse CLK2 becomes L level again, the next image data begins to be read out. Since the output of image sensor 1 is an integral waveform, level of the image data SIG increases gradually while clock pulse CLK2 is at L level. The period of L level is T1 as shown in FIG. 9.

A sample hold circuit 2 holds image data SIG when a sample hold pulse S/H is at H level. This signal held in the sample hold pulse S/H becomes an image data SIG0. This output level of the image data SIG0 is V100%.

In case of 200% enlargement processing, the frequency of a clock pulse CLK2 is set low compared with that of 100% processing. If there is no means for causing constant reading period 48b, the sample hold circuit 2 holds the data corresponding to a portion where the image data SIG, that is, the integral waveform, is saturating. Considering that the image data SIG from image sensor is outputted during L level period of clock pulse CLK2, a timing is coordinated in order to obtain the same waveform shape which appears during L level period of CLK2 in comparison with 100% processing.

In the present embodiment, L level period T1 at 200% enlargement processing of a clock pulse CLK2 is equalized with L level period T1 of 100% processing. The sample hold pulse S/H at 200% enlargement processing becomes H level for a predetermined time, where image data takes peak value, just before the rising edge of clock pulse CLK2, the same as the sample hold pulse S/H at 100% enlargement processing.

Thereby, sample hold circuit 2 holds the same portions from the rising edge of image data SIG having an integral waveform for both case of 100% processing or 200% enlargement processing. Therefore, the linearity of the signal does not degrade since the saturated portions of the integral waveform are held. In other words, the output level V 100% at 100% processing is almost equal to the output level V 200% at 200% enlargement processing. A dotted line portion of the image data SIG at 200% enlargement processing shows an output waveform at 200% enlargement processing of the prior art when the conventional clock pulse is used.

Figure 10:
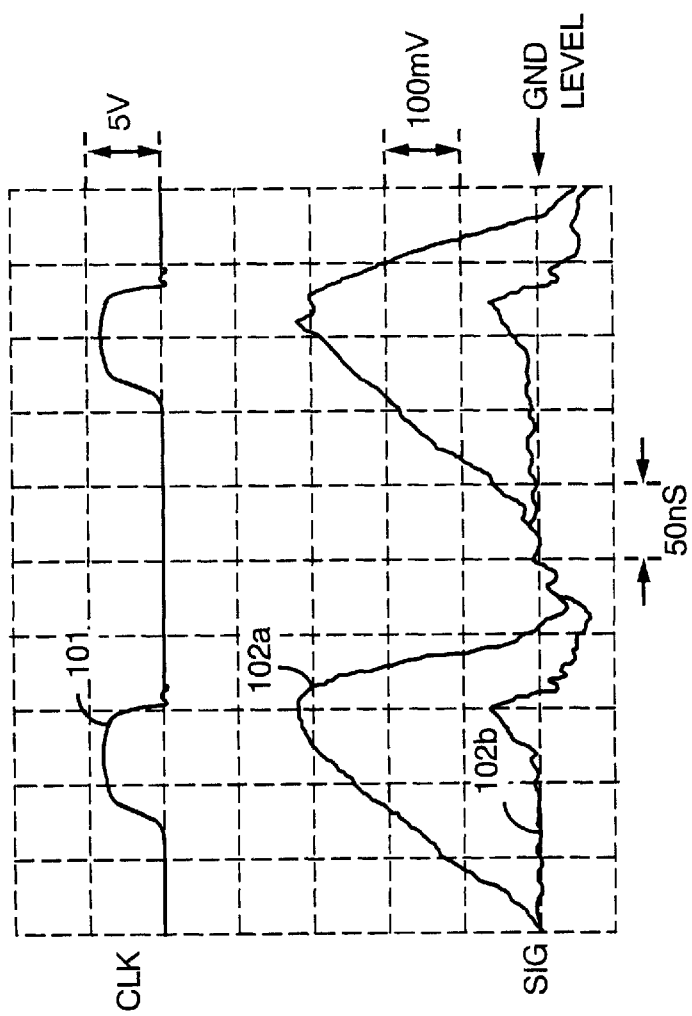
FIG. 10 is waveform examples of a clock pulse and an image data.

The above is further explained using an actual concrete waveform. FIG. 10 shows a relation between clock pulse CLK and image data SIG when the processing is carried out by high-speed clock of 3.75 MHz. In FIG. 10, the horizontal axis means time axis and one division of the horizontal axis has 50 ns. The vertical axis has 5 V per division for clock pulse CLK, and 100 mV per division for image data SIG. The waveform 102a shows image data SIG when reading a white manuscript. The waveform 102b shows image data SIG when reading a black manuscript.

Waveform 102a is explained below. The image data SIG increases almost linearly during L level period of clock pulse CLK, since the image data SIG is at the rising edge of the integral waveform. The rising edge of the image data SI delays approximately 80~100 ns from clock pulse CLK.

The sample hold pulse S/H is provided so that sample hold circuit 2 holds image data SIG at the rising edge of clock pulse CLK. A pulse height Ve of the image data SIG at this point is approximated by the following formula during time t for L level of clock pulse CLK.

$$Ve=(280/125)t-280 \ [mV] \quad (1)$$

For example, in FIG. 10, Ve (100%)=280 mV when t=250 ns. Next, 200% enlargement processing is explained. At this time, clock pulse CLK becomes 3.75 MHz/2=1.875 MHz. Since the conventional art has no means for generating constant reading period 48b, the time t becomes 400 ns. Therefore, according to formula (1), Ve (200%)=616 mV. That is, the output level of image data SIG at 200% enlargement processing is 2.2 times as much as that of image data SIG at 100% processing. This causes the burden of a variation compensation circuit to increase which is arranged at the succeeding stage not illustrated, which lengthens processing time and causes problems such as deterioration of image quality. In fact, it is desirable to control the variation of Ve within ±20%.

When causing sample point time t to be constant for any voluntary enlargement ratio, quantization error for calculation is added, the output level does not always become equal. Therefore, it is necessary to set the time t within a predetermined range as described below. In FIG. 10, for example, in order to control the variation of Ve within ±20%, it is necessary to set the variation of Ve such as variation of Ve<56 mV. A permissible variation of time t is 25 ns from formula (1). As described above, this value is 10% of standard time t=250 ns. It is practical to set L level period T1 of clock pulse CLK1 at enlargement processing within a range from 90% to 110% of period T1 at 100% processing.

According to the fourth embodiment, means for generating constant reading period of image data at enlargement or reduction processing is provided in the timing generator 4. Accordingly, an image signal outputted as the integral waveform is reset at the same time as that of at 100% processing, regardless of variation of clock frequency at enlargement or reduction processing. Therefore, there is no fear for saturation of the image signal. Since variation width of the output value by changing enlargement ratio can be reduced, it is possible to reduce a burden of variation correction circuit such as ALC. This fourth embodiment can be also applied not only to the enlargement processing but also to the reduction processing.

Embodiment 5

An image signal processing apparatus of the fourth embodiment changes the clock pulse so that reading period of image data may be constant. An image signal processing apparatus of a fifth embodiment also changes a location of sample hold pulse in order to obtain a constant reading period of image data.

Figure 11:
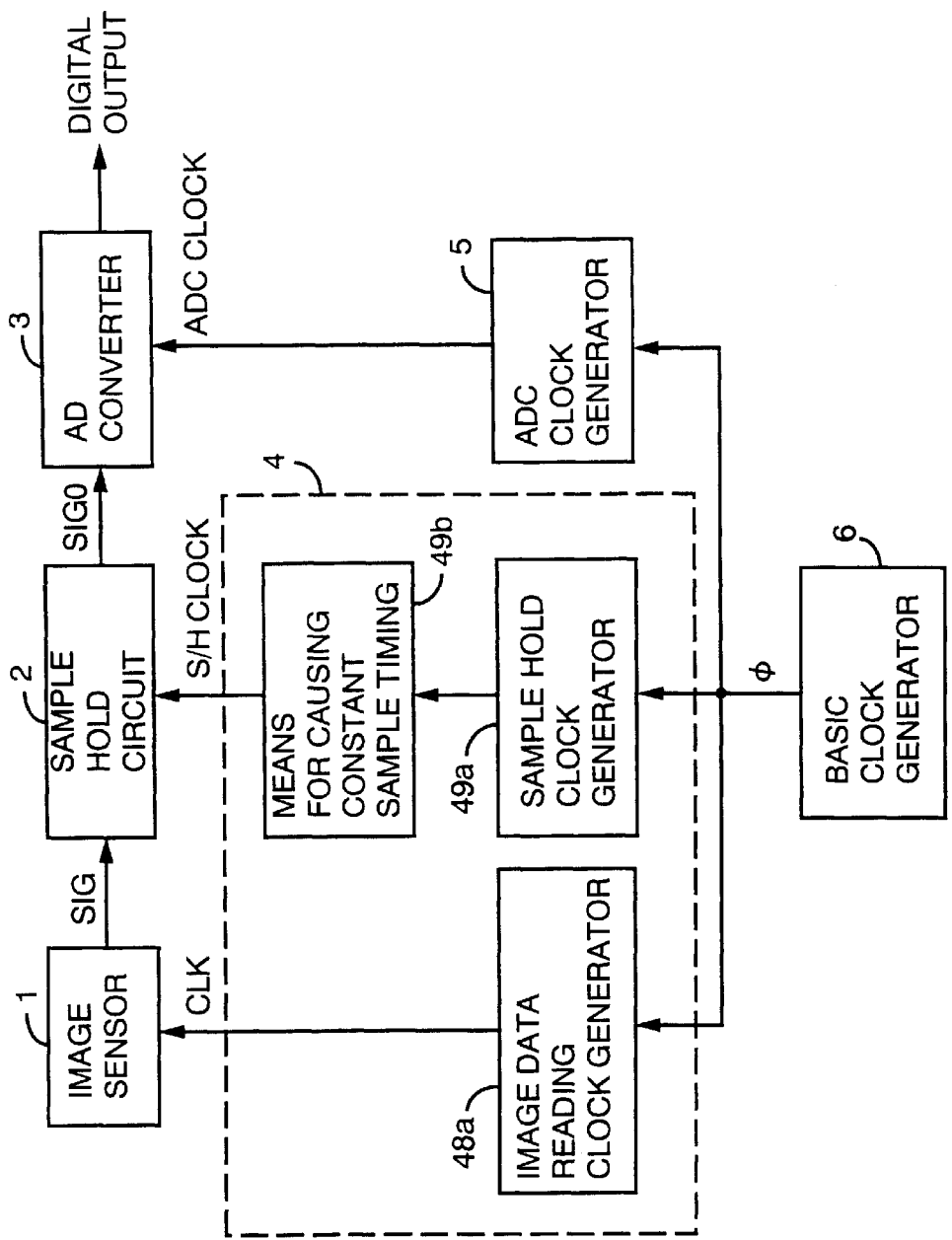
FIG. 11 is a block diagram showing an image signal processing apparatus for image sensor of a fifth embodiment of the present invention.

FIG. 11 is a block diagram of an image signal processing apparatus for image sensor in a fifth embodiment. In FIG. 11, the timing generator 4 is the same as that in FIG. 2. In this embodiment, outer parameter data is supplied to the timing generator 4.

In FIG. 11, an image signal processing apparatus comprises an image data reading clock generator 48a which generates an image data reading clock CLK (corresponding to CLK1 in FIG. 1) according to the system clock φ, and outputs it to image sensor 1, a sample hold clock generator 49a for generating a sample hold pulse S/H according to the system clock φ, a means 49b for generating constant sampling timing and means for receiving an output from the sample hold clock generator 49a and always generating a sample hold pulse S/H and outputting it to a sample hold circuit 2 after a predetermined time when the image data are read out even if period or L level of the sample hold pulse CLK are changed.

Image sensor 1, sample hold circuit 2, AD converter 3, AD conversion clock generating apparatus 5, and system clock 6 are the same or the corresponding portions as those shown in the first embodiment.

Figure 12:
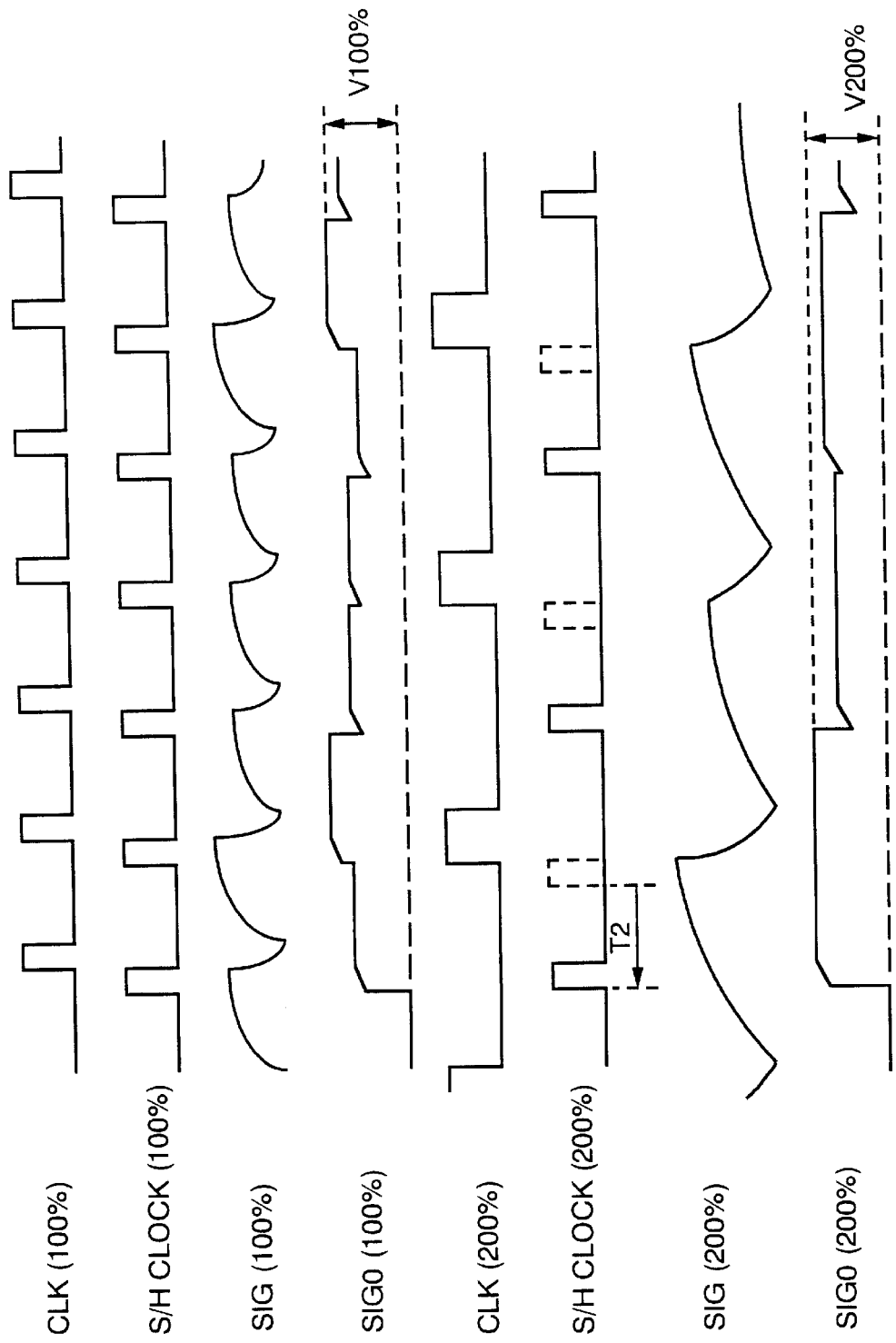
FIG. 12 is a timing chart for taking in an image of the image signal processing apparatus for image sensor of the fifth embodiment of the present invention.

An operation of the fifth embodiment is explained using a timing chart of FIG. 12. FIG. 12 is a timing chart showing the fifth embodiment of the present invention. In FIG. 12, although duty of clock pulse CLK1 is constant, a sample hold pulse S/H at 200% enlargement processing advances by T2 to the sample hold pulse S/H 200% enlargement processing of the prior art which is shown in the dotted line. In other words, means for generating constant sampling timing 49b shifts the timing which is generated in the sample hold clock generator 49a by T2 so that timing of H level of sample hold pulse S/H at enlargement or reduction processing becomes the same as that of 100% processing. Therefore, the operation and effect are the same as that of the fourth embodiment. This period T2 corresponds to the time change of L level generated according to change of clock pulse CLK.

According to the fifth embodiment, timing generator 4, which holds the same position of the image data at enlargement or reduction processing, is provided. Accordingly, an image signal outputted as the integral waveform is sample-hold at the same timing as that of at 100% processing, regardless of variation of clock frequency at enlargement or reduction processing. Therefore, there is no fear for saturation of the image signal. Since variation width of the output value by changing enlargement ratio can be reduced, it is possible to reduce a burden of variation correction circuit such as ALC. This fifth embodiment can be also applied not only to the enlargement processing but also to the reduction processing.

It is practical to set a location of the sample hold pulse within a range from 90% to 110% in the same way of fourth embodiment.

What is claimed is:

1. An image signal processing apparatus comprising:

an image sensor for reading an image and outputting image data representing the read image as an image data signal;

a sample-and-hold circuit for sampling and holding said image data signal for a predetermined output period;

an A/D converter for converting an analog signal outputted by said sample-and-hold circuit corresponding to a held image data signal into a digital signal;

a reference signal generator for generating a reference signal;

a timing generator for generating a read timing signal which is used to readout image data from the image sensor for a predetermined reading period and a hold timing signal which controls hold timing of the sample-and-hold circuit according to said reference signal; and an A/D conversion timing generator for generating a conversion timing signal according to said reference signal for controlling operation of said A/D converter;

whereinsaid timing generator changes either said readtiming signal or said hold timing signal so that the same data from the starting point of the output of the image data is held, when changing the output period of the image data for image enlargement or reduction processing.

2. The image signal processing apparatus for image sensor of claim 1, said timing generator further comprising:

means for generating constant reading period for causing said reading period to be constant by changing the reading timing signal when changing the output period of the image data.

3. The image signal processing apparatus for image sensor of claim 1, said timing generator further comprising:

means for generating constant sample timing which changes said hold timing signal corresponding to the change of reading period of the image data when changing the output period of the image data.

* * * * *